United States Patent [19]

Lemaster

[11] 4,421,354

[45] Dec. 20, 1983

[54] AIR FOIL CONSTRUCTION

[75] Inventor: Glenn A. Lemaster, Vancouver, Wash.

[73] Assignee: Sepco Enterprises, Inc., Portland, Oreg.

[21] Appl. No.: 337,741

[22] Filed: Jan. 7, 1982

[51] Int. Cl.³ .............................................. B62D 35/00
[52] U.S. Cl. .................................................... 296/1 S
[58] Field of Search .................... 296/1 S, 91; 105/2 R

[56] References Cited

U.S. PATENT DOCUMENTS

| | | | |
|---|---|---|---|
| 3,947,065 | 3/1976 | Geiger | 296/1 S |
| 3,960,402 | 6/1976 | Keck | 296/1 S |
| 3,999,796 | 12/1976 | Greene et al. | 296/1 S |
| 3,999,797 | 12/1976 | Kirsch et al. | 296/1 S |
| 4,082,341 | 4/1978 | Gore | 296/1 S |
| 4,103,957 | 8/1978 | Landry et al. | 296/1 S |
| 4,131,308 | 12/1978 | Holka et al. | 296/1 S |
| 4,131,309 | 12/1978 | Henke | 296/1 S |
| 4,262,953 | 4/1981 | McErlane | 296/1 S |
| 4,318,565 | 3/1982 | Lay | 296/1 S |
| 4,320,920 | 3/1982 | Goudey | 296/1 S |

FOREIGN PATENT DOCUMENTS 2743203  4/1979  Fed. Rep. of Germany ...... 296/1 S

Primary Examiner—Richard A. Bertsch
Attorney, Agent, or Firm—Klarquist, Sparkman, Campbell, Leigh & Whinston

[57] ABSTRACT

An air foil having a general shape of a half pyramid, but wherein when mounted in place, its rear edges are vertical. Such rear edges terminate in tapered marginal flanges which are angularly related to the remainder of the structure for air deflection purposes. This air foil can be cab mounted or mounted on the trailer in front of the dolly. Another form of air foil comprises a spoiler for the rear upper corner of a trailer. A further air foil comprises an air deflector for the bumper of a highway vehicle.

6 Claims, 6 Drawing Figures

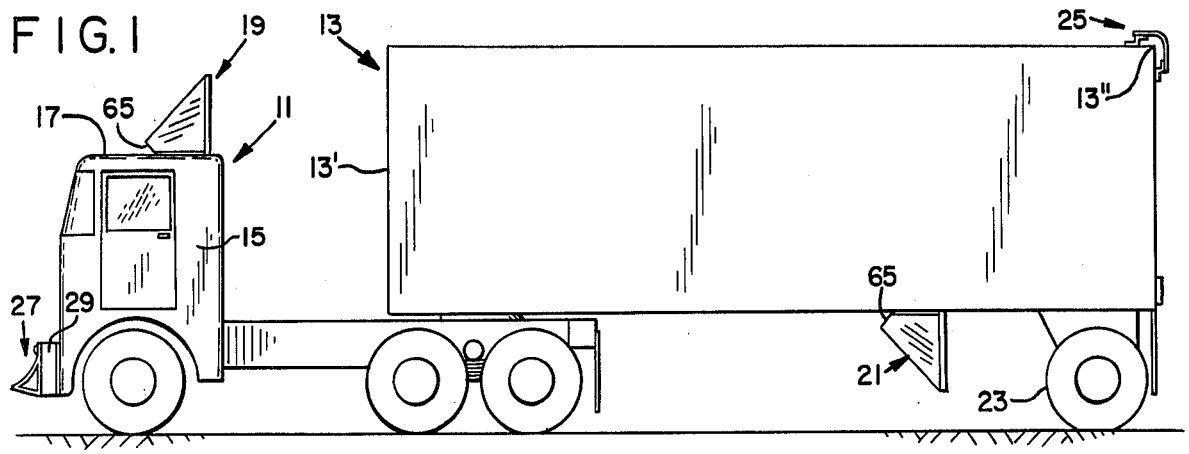
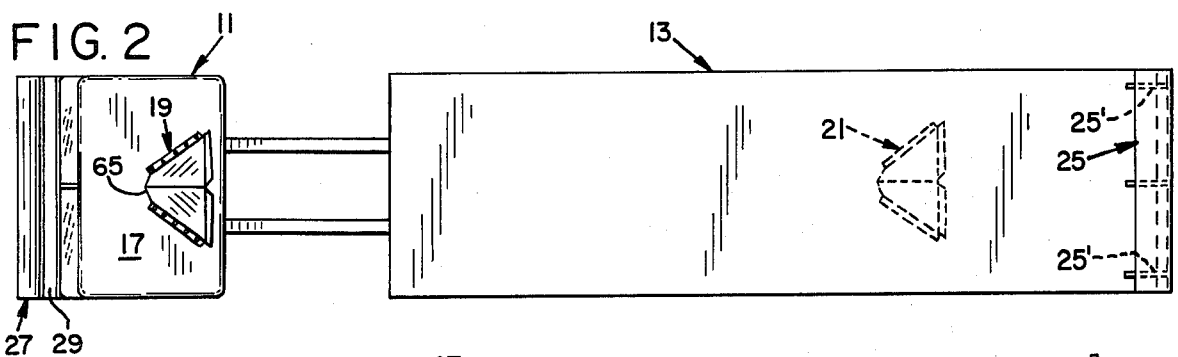
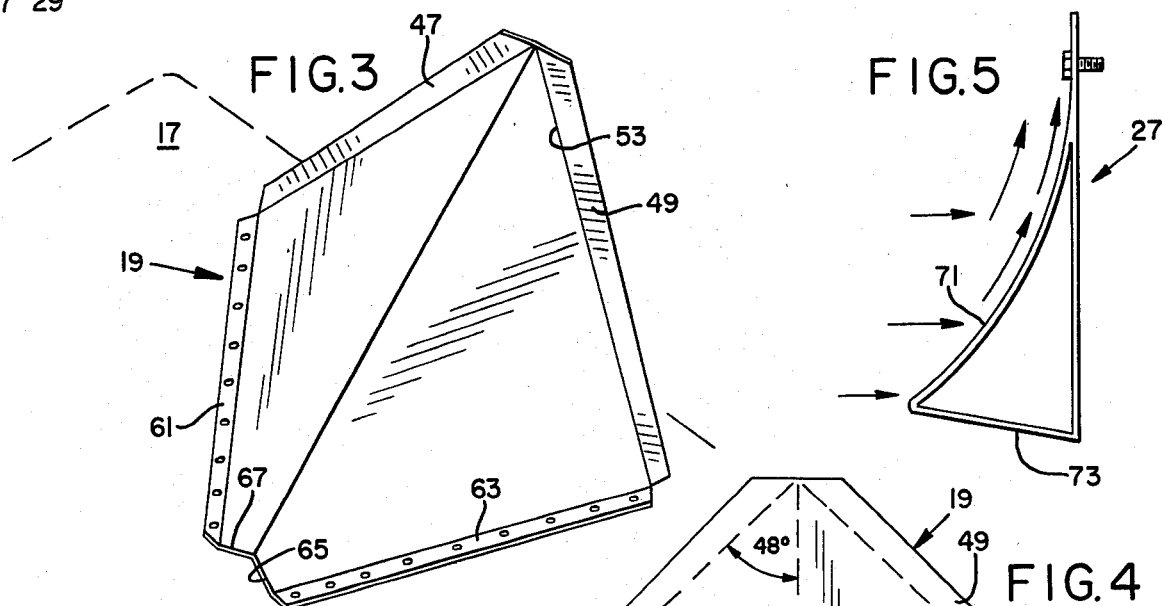
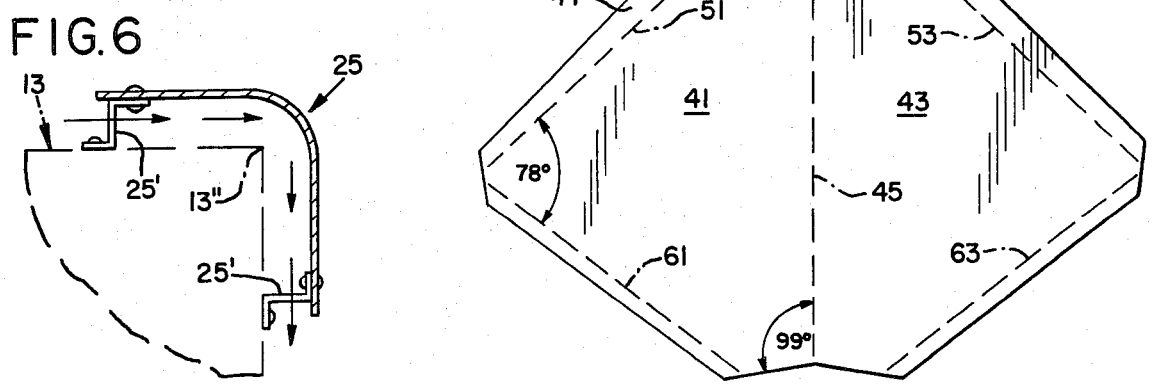

AIR FOIL CONSTRUCTION

This invention relates to air foils for reducing air drag on vehicles and particularly for vehicles intended for highway travel. The invention will be explained in connection with a highway tractor and one or more semi-trailers, to be towed by the highway tractor, but the invention is not intended to be limited to that particular type of vehicle, but is applicable to other vehicles where similar circumstances exist. At least part of the present invention is disclosed in Disclosure Documents No. 099437, 099438, 099439 and 099440 filed Apr. 13, 1981, which are incorporated herein by reference.

With the high cost of fuel, more and more attention is directed to getting better mileage.

Tractors and trailers are not aerodynamically designed for reducing air drag. As a matter of fact, a semi-trailer with its box-like configuration might be ideal for purposes of carrying loads, but it sets up substantial air drag which significantly reduces mileage.

One primary area of air drag is the zone at the square front of the trailer. Prior to my invention, an air foil device has been sold for mounting on the top of the highway tractor cab. It has the general appearance of half a pyramid. It is partially successful in directing some of the air laterally and upwardly, but it has disadvantages. I have discovered that improvements in reducing air drag can be achieved by designing a half pyramid structure with its rear edges in a vertical plane, i.e., parallel to the front face of the trailer. The previous device had the edges inclined to such a plane with a resultant greater air drag than my construction.

A front opening is provided in the prior device to allow a flow of air into the interior of the hollow air foil. I have found that this opening is too large. I can reduce the size of the opening to achieve better balance of eliminating creation of a vacuum within or behind the air foil and yet achieve the lateral and upward deflection of a substantial portion of the air met by the air foil.

Still further, the prior device has deflector flanges at its rear edges, but I have discovered that these flanges which are of uniform width, can be improved upon in their functioning if they are made of a width which tapers from its bottom edge, upwardly in progressively increasing dimensions.

I have further discovered that I can substantially reduce the air drag on the rear dolly of a trailer by mounting one of my air foils on the underside of the trailer just forwardly of such rear dolly.

Still further, I have discovered that I can reduce air drag on the square bumper typically provided on highway tractors by providing an air foil of my design on such bumper.

Finally, I have provided an air foil in the form of a spoiler for the rear upper corner of the trailer, so that the air is directed smoothly around such edge, to lessen turbulence at the rear end of the trailer.

An important object of the present invention is to provide an improved air foil structure for various places on a vehicle and particularly a highway vehicle, and particularly to provide one that is relatively inexpensive in construction.

The subject matter which I regard as my invention is particularly pointed out and distinctly claimed in the concluding portion of this specification. The invention, however, both as to organization and method of operation, together with further advantages and objects thereof, may be best understood by reference to the following description, taken in connection with the following drawings, wherein like reference characters refer to like elements.

BRIEF DESCRIPTION OF THE DRAWINGS

FIG. 1 is a side elevational view of a tractor-trailer rig equipped with air foils of my invention;

FIG. 2 is a top view of the arrangement of FIG. 1, showing the relationship of the air foils to the other parts of the rig;

FIG. 3 is a perspective view of the cab mounted air foil;

FIG. 4 is a developed view of the cab mounted air foil;

FIG. 5 is an enlarged view of the bumper foil; and

FIG. 6 is an enlarged view of the air spoiler.

Referring to FIG. 1, a highway tractor 11 is shown as towing a trailer 13, both, apart from my air foils, being of conventional construction. The highway tractor has a cab 15 having a roof 17 on which one of my air foils 19 is mounted.

Another one of my air foils 21 is mounted beneath the trailer and forwardly of the rear dolly 23 of the trailer. A still further one of my air foils 25 is shown at the upper rear corner of the trailer. Finally, I provide an air foil 27 for the bumper 29 of the tractor.

FIG. 4 shows the developed shape of the air foil 19, where it is evident that the foil in its developed shape is roughly trapezoidal, and may be considered as having two major sections 41 and 43, which, in the bent shape of the foil, are in planes 90° to one another with the line of bending shown at 45.

Referring to FIGS. 1-4, the panels or sections 41 and 43 have marginal portions 47 and 49, respectively. Each marginal portion is to be bent along line 51 for panel 41 and 53 for panel 43, to provide an air deflecting flange, which for convenience are given the same reference numerals as that of the marginal portions. The angles that these flanges bear to the associated panels depend somewhat on the spacing between the foil and the trailer. This spacing can vary, for instance, anywhere from 40 inches to 90 inches, since it is desirable to avoid turbulence behind the foil. When the trailer is relatively close to the cab foil, the angle between each flange and its section will be less than when the foil is spaced a substantial distance from the trailer. At that time it is desired to have the angle rather abrupt, say in the neighborhood of 50°, so as to deflect the air out sufficiently far that when it returns, it will contact the sides of the trailer rather than pass inwardly onto the front 13' (FIG. 1), where it would create turbulence. I have discovered that I can make the flanges of varying angular relationship to the panels by anywhere between 30° and 50° to achieve the desired reduction in drag.

The panels have lower marginal portions 61 and 63 bent to provide mounting flanges (given the same reference numerals), which are at such angles to the panels as to lie flat against the roof 17 of the cab 15. The flanges are secured by screws to the roof.

The forward portion of the foil 19 is truncated to provide an opening 65 (FIG. 1) defined by an edge 67 (FIG. 3), to allow a sufficient amount of air to enter into the hollow interior of the foil as to eliminate the creation of a vacuum (and thus turbulence) behind the foil.

I have noted that the size of the opening is important. It is easy to make the opening large enough to eliminate the vacuum, but if it is too large, the useful purpose of the foil, in smoothly deflecting the air from directly impacting on the front 13' of the trailer, is substantially decreased.

I have found that if the size of the opening bears a certain relationship to the size of the foil, I can eliminate the vacuum with a minimum loss of air deflection. I have discovered that if the area of the opening, as projected onto a transverse vertical plane, is approximately 1/33 of the area of the foil, as projected on such plane, the advantages just recited are obtained. The ratio may vary from 1/30 and 1/36, but beyond those ratios, the foil is unsuitable or performs inefficiently.

As is evident from FIG. 1, the foil is positioned at the rear of the roof 17 just before the roof line starts to curve downwardly. I prefer to make the height of the foil so that its peak is a few inches less than or near that of the roof line of the trailer.

I have found that I can achieve less turbulence than that of the existing foil referred to in the first part of this patent application, if I make the rear edges of the foil lie in a vertical plane rather than having them inclined to the vertical. In one foil that I produced, I achieved this vertical relationship by making the included angle between the marginal bend lines equal substantially 78° at the outer corners, and made the included angle between the central bend line 45 and either of the bend lines 51 and 53 equal substantially 48°.

While I have shown a one piece unit in FIGS. 3 and 4, I contemplate that the foil may be fabricated from two halves joined at what would be the bend line 45, by having a flange of one riveted to the other half.

I have discovered that I can get better performance from my foil by making the marginal flanges 47 and 49 of tapered form, from the upper portions thereof to the lower portions. This taper should be in the order of one inch of taper per 32 inches of deflector foil length. This construction augments the functioning of the foil, by increasing the deflection at the narrow upper portion of the foil to an extent greater than at the lower wider portion, without encountering objectionable turbulence.

Another way I can cut down air drag is to provide the foil 21 in front of the rear dolly 23 of the trailer. I have discovered that there is a substantial amount of drag on this dolly, which can be substantially reduced by the use of an air foil 21 which is substantially identical to air foil 19 but is inverted and fastened to the underside of the bed of the trailer. Typical trailers have a series of transverse beams and my foil 21 is cut out to accommodate these beams and allow the securing flanges (not identified for foil 21) to be secured to the underside of the trailer bed.

It is important that the foil 21 deflect a major portion of the air outwardly an extent far enough to clear the rear wheels at the dolly 23, but not so far outwardly as to deflect the air and thus any spray that it might entrain onto passing vehicles. On the other hand, if the deflector 21 allows the deflected air to return in front of the wheels at dolly 23, they will encounter the dolly, setting up objectionable turbulence. I have found that I can achieve the above advantages by locating the foil 21 a suitable distance forwardly of the dolly as to deflect the air just enough that when it starts to return, it engages the sides of the wheels at the dolly 23, rather than engaging the forward faces of the wheels and tires and the remainder of the dolly, and rather than so far outward as to miss such wheels.

Assume that the foil is approximately one-half the width of the trailer and has the shape shown in the drawings, if it is located forwardly of the wheels a distance greater than the height of the foil but less than twice such height, and assume that the foil is of such dimensions that it projects from the underside of the trailer down beyond one-half of the distance from the underside of the trailer to the roadway, then many of the advantages desired can be obtained. In one installation, where the foil was slightly over 30 inches tall, the spacing of the lower tip of the foil was approximately 14 inches from the roadway. The foil was located approximately 52 inches forwardly of the front portions of the dolly tires. With this arrangement, the advantages of the present invention were obtained.

Note that since the foil 21 is identical, or substantially identical, to foil 19 there is an opening at the front of foil 21 like there is for foil 19 and of the same relative size. This opening allows the through-flow of a minor portion of the air which accomplishes two purposes. First, it eliminates the creation of a vacuum back of the foil 21 and secondly it enables adequate cooling of the brakes and other portions of the dolly.

At the rear of the trailer, I make the foil 25 in the form of a curved hood extending substantially coextensively with the width of the trailer (FIG. 1) and secure it to the trailer by plural "Z" elements 25' (FIGS. 2 and 6) to provide a curved tunnel directing air in a curved path around the upper rear angular corner 13" of the trailer. This cuts down turbulence at the rear of the trailer. The body of the hood can be a single piece, or in two pieces arranged end to end, transversely of the trailer.

The air foil 27 is of generally triangular shape in cross section and is of hollow snout like design substantially coextensive, widthwise, with the bumper 29 and has a dished or concave upper surface or face 71 and a more or less straight lower surface or face 73.

FIG. 5 shows that air which would impact directly on the front flat vertical face of the bumper, now impacts the curved surface 71 and is deflected upwardly and in a direction to pass over and around the cab 15. If desired, the bumper itself can be replaced by the foil 27, because the bumpers nowadays are more for show than for pushing purposes. It is not anticipated that the foil will undergo any critical damage unless the truck is involved in an accident of an extensive nature.

What is claimed is:

1. An air foil for the cab of a highway tractor having a box-like trailer:
    a foil structure having a pair of panels disposed at a substantial acute angle relative to one another to provide a substantially straight edge for cleaving into the air traveled by the vehicle,
    means for mounting the air foil structure on the roof of the tractor cab with the edge facing forwardly but at an acute angle to the horizontal and to the vertical,
    the rear edges of said panels lying in a vertical plane,
    said air foil structure having an opening formed in its nose portion to facilitate entry of air into said air foil structure,
    the rear margins of said panels terminating in outwardly flaring flanges for deflecting air laterally,
    said flanges tapering in width so as to decrease in size from the upper portions thereof to the lower portions, so that air deflection increases as the displacement of the flange from the sides of the trailer increases.

2. An air foil as described in claim 1, in which the angle formed by said outwardly flaring flanges with said panels varying proportionately to the distance of the tractor from the trailer.

3. A foil as recited in claim 2 wherein said flanges make an angle with the associated panels of between 25° and 55°.

4. A foil as recited in claim 1, wherein the size of the opening, when projected on a transverse vertical plane, is approximately 1/33 of the area of the foil, as projected on said plane.

5. An arrangement for lessening the air drag on a wheeled dolly comprising an air foil structure having a pair of essentially triangular panels angularly related to one another and joined at one pair of edges to define a straight edge, another pair of edges constituting the base of said air foil structure, the remaining pair of edges defining rear edges of said air foil structure, means for mounting said air foil structure in a position with the base uppermost and just forward of a wheeled dolly and in a position to cleave the air which would otherwise be directed onto said dolly and for deflecting said air outwardly laterally, the nose of said air foil structure being truncated to define an opening for the passage of air into said air foil structure, the rear margins of said panels terminating in outwardly flaring flanges for air deflection, said flanges tapering in width so as to increase in size from the base portion downwardly so that air deflection increases as the displacement of the flanges from the planes containing the faces of the tires of said dolly increases.

6. An arrangement as recited in claim 5, wherein said foil is on the underside of a body supported by the dolly, and projects downwardly more than one-half the distance between the underside of the body and a supporting roadway, said foil being located forwardly of said dolly a distance greater than the height of the foil, but less than twice such height, said foil being formed so as to deflect air laterally a sufficient extent, that upon return it engages the side faces of the wheels and tires of the dolly.

* * * * *